United States Patent [19]

Connolly

[11] 4,193,503  
[45] Mar. 18, 1980

[54] SLURRY SCREEN

[76] Inventor: James D. Connolly, 410 Johnston St., Princeton, W. Va. 24740

[21] Appl. No.: 925,637

[22] Filed: Jul. 17, 1978

[51] Int. Cl.² .............................................. B07B 1/12
[52] U.S. Cl. .................................... 209/393; 210/499
[58] Field of Search ............... 209/235, 273, 352, 151, 209/392–395, 274, 268, 281; 210/483, 499; 162/352, 374

[56] References Cited

U.S. PATENT DOCUMENTS

| | | | |
|---|---|---|---|
| 1,180,703 | 4/1916 | Detwieler | 130/24 |
| 2,942,730 | 6/1960 | Fontein | 209/273 |
| 3,165,440 | 1/1965 | Jordansson | 162/352 |
| 3,451,555 | 6/1969 | Ginaven | 210/433 |
| 3,777,893 | 12/1973 | Ginaven | 210/499 |
| 3,778,342 | 12/1973 | Charbonneau | 162/374 |
| 3,880,771 | 4/1975 | Hayes | 162/352 |
| 4,113,626 | 8/1978 | Detcher | 209/393 |

*Primary Examiner*—Ralph J. Hill  
*Attorney, Agent, or Firm*—Wilmer Mechlin

[57] ABSTRACT

A self-cleaning screen for separating fibrous and other solids from flowing slurries, the screen having a flow surface formed by parallel laterally spaced screen wires disposed perpendicular to the flow direction of the slurry, each screen wire having a flat rearwardly declining top bounded forwardly by an arcuately convex leading edge and rearwardly by a sharp trailing edge and downwardly converging flat sides, the screen inducing a ripple motion in the slurry flowing across the screen wires and directing solids over and liquid downwardly between the wires.

6 Claims, 4 Drawing Figures

SLURRY SCREEN

BACKGROUND OF THE INVENTION

Slurries or liquid-solid mixtures in which solids are dispersed in water or other carrier liquids, at some stage of processing ordinarily require at least partial separation of the solids from the liquid carrier for either removing contained solids or recovering them for an intended use, usually after further processing. Aside from the Fourdriner screens peculiar to paper making, numerous types of separating devices have been used for deliquefying such slurries, including filter or other presses, centrifugal separators and various forms of screens.

For separating fibrous and other solids from slurries in which the solids are floating or suspended in the carrier liquid, whether purposed for pollution control or to recover usable solids, such as natural or synthetic fibers, a current practice is to flow the slurry over a screen having a flow surface formed by laterally spaced screen wires or bars disposed perpendicular to the flow direction of the slurry. Whether curved or horizontal or inclined flat screens and stationary or vibrating, a problem posed in separating solids by screens from a flowing slurry, particularly when the solids are or include fibrous materials, is the tendency of the fibers to clog or blind the screen openings between the screen wires. Proposed solutions for this problem are those of Ginaven U.S. Pat. No. 3,451,555 in which the screen wires have concave top surfaces for producing an undulating motion in the flowing slurry and Fontein U.S. Pat. No. 2,942,730 in which flat-topped and sided screen wires each receives slurry on a transition surface leading upwardly to its flat top from a line of intersection with its leading side. Another proposed solution is that of Ginaven U.S. Pat. No. 3,777,893 in which the screen wires are bowed and thinned between the longitudinally extending widely spaced tie rods by which they are interconnected to cause the slurry to move away from the tie rods and concentrate along the troughs of the screen wires. It is to an improvement in self-cleaning screens for separating fibrous and other solids from flowing slurries that the present invention is particularly directed.

SUMMARY OF THE INVENTION

The primary object of the present invention is to provide an improved screen for separating fibrous and other solids from a flowing slurry, wherein the flow surface of the screen is formed by parallel spaced screen wires disposed transversely of the flow or flow direction of the slurry and so arranged and constructed as to pass such solids over and carrier liquid through the screen without blinding of openings between the screen wires.

Another object of the invention is to provide an improved screen for separating fibrous and other solids from a flowing slurry wherein parallel laterally spaced screen wires forming the screen's flow surface and disposed transversely of the flow direction of the slurry, each has a flat top surface bounded forwardly by an arcuately convex leading edge and rearwardly by a sharp trailing edge for directing the flowing slurry from one to the next screen wire and progressively removing liquid through the openings therebetween.

An additional object of the invention is to provide an improved screen wire of the character described in the preceding object in which the screen wires have downwardly converging sides and are interconnected by underlying longitudinally extending parallel widely spaced tie rods and by rearward tilting of the wires or otherwise, the flat top surfaces of each is rearwardly declined for so directing the flowing slurry against the confronting front of the next screen wire as to cause flow of solids over and liquid downwardly between the wires.

A further object of the invention is to provide an improved screen wire for separating fibrous and other solids from a flowing slurry wherein upper surfaces of the screen wires are so shaped as together to present to the flowing slurry a stepped surface for inducing a ripple flow stratifying the slurry into upper lighter and lower heavier strata and enabling each wire to so direct the slurry against a confronting frontal area of the succeeding wire as to cause solids in the upper stratum to flow upwardly onto a top surface and liquid to be discharged downwardly along a leading side of the succeeding wire.

Another object of the invention is to provide a screen for separating fibrous and other solids from a flowing slurry wherein a flow surface of the screen is formed by parallel spaced screen wires disposed transversely of the flow direction of the slurry and each having a flat top and leading side joined by an arcuately convex leading edge, wherein the angular relation of the top and side relative to each other and longitudinally extending spaced tie bars interconnecting the screen wires determines the area of the succeeding wire impacted by the flowing slurry and the rate of discharge of liquid through the screen and both the impacted area and discharge rate are variable by varying the initial angular disposition of the screen wires relative to the tie bars.

Other objects and features of the invention will appear hereinafter in the detailed description, be particularly pointed out in the appended claims and be illustrated in the accompanying drawings, in which:

FIGURE DESCRIPTION

DETAILED DESCRIPTION

Figure 1:
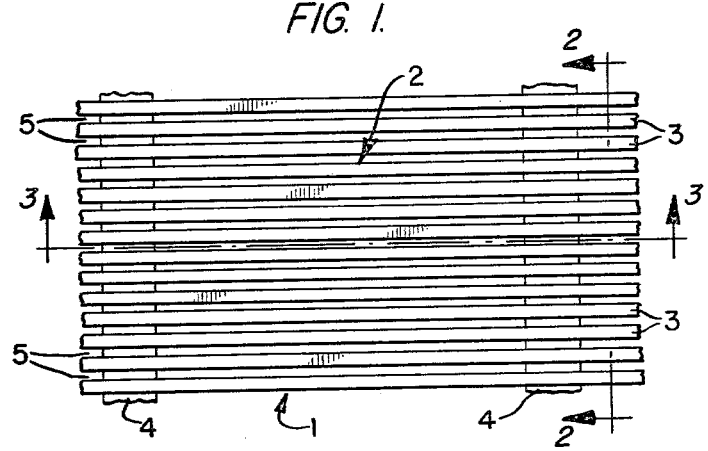
FIG. 1 is a fragmentary plan view of a preferred embodiment of the screen of the present invention.
Figure 2:
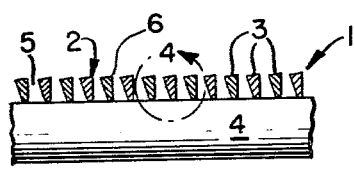
FIG. 2 is a vertical sectional view taken along lines 2—2 of FIG. 1.
Figure 3:
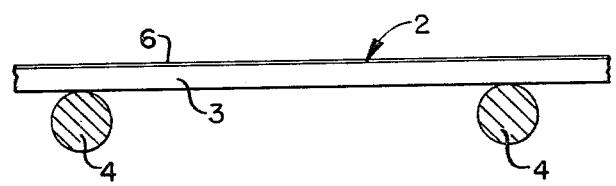
FIG. 3 is a vertical sectional view taken along lines 3—3 of FIG. 1.
Figure 4:
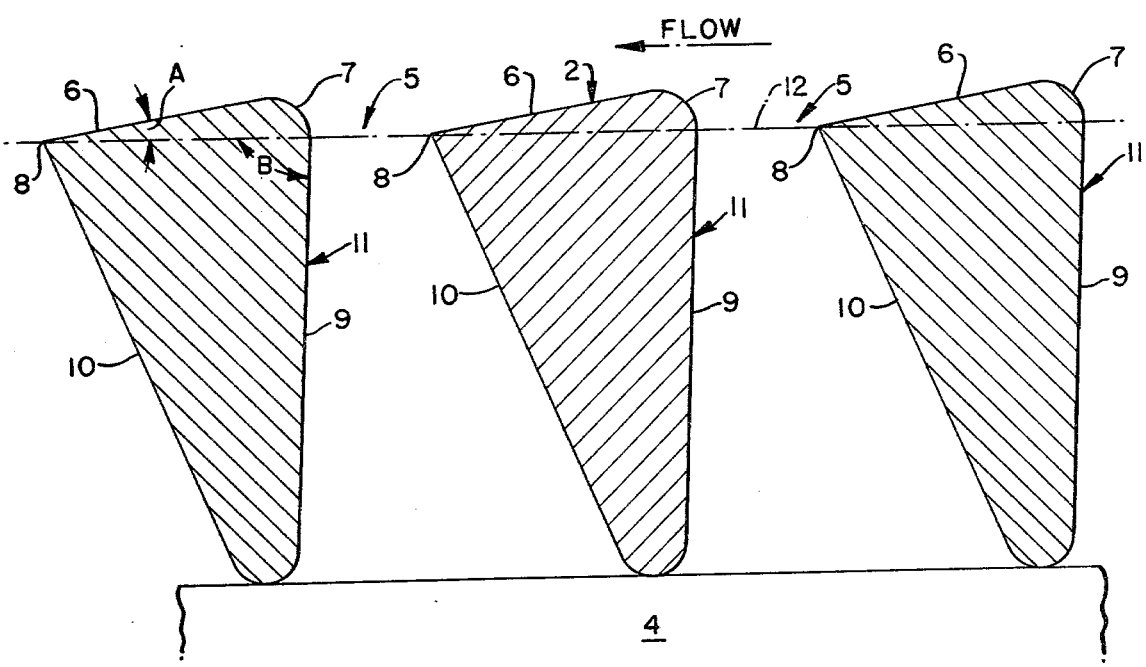
FIG. 4 is an enlarged fragmentary vertical sectional view of the screen wires encircled in FIG. 2 on the section of that figure.

Referring now in detail to the drawings in which like reference characters designate like parts, the improved screen of the present invention is designed for separating solids from flowing slurries and particularly adapted to separate fibrous and other solids floating, suspended or otherwise dispersed in water or other carrier liquid without being blinded by the separated solids. In its non-blinding capability in fibrous and other solid separation, the improved screen thus is suited for a wide variety of uses, such as removing polluting solids from raw sewage and recovering natural and synthetic fibers and other usable solids from slurries produced in processes involving water or other liquid treatments.

Depending on the intended use, the improved screen designated as 1, may be a static or stationary or an oscillating or otherwise vibrating screen or screen unit presenting to a flowing slurry a generally flat or cylindrically or otherwise concavely curved flow surface or deck 2 and its generally flat-surfaced form may be a horizontal or inclined individual unit or one of a plurality of sections of a concave screen. In any case, the flow surface 2 is formed by parallel spaced screen wires or bars 3 extended or disposed transversely of or perpendicular or normal to the direction of flow of the slurry on the screen and the screen wires are interconnected, suitably by resistance or fusion welding, to underlying parallel widely spaced tie rods 4 extending or disposed longitudinally of the screen and in or parallel to the flow direction of the slurry. Separated or spaced laterally by correspondingly transversely extending or disposed screen openings or slots 5, the screen wires 3 each has a flat or planar top or top surface 6 bounded or terminated forwardly by an arcuately and preferably cylindrically convex or rounded leading edge 7 and rearwardly by a sharp or pointed trailing edge 8. Generally wedge-shaped, each of the screen wires 3 has downwardly converging front or leading and rear or trailing sides 9 and 10, respectively, of which the leading side at least preferably is flat and merges with and is disposed tangentially to the leading edge 7, as does the top 6.

In a typical installation the slurry to be screened is delivered to or discharged onto the leading end of the screen 1 from a headbox (not shown) for flow along the flow surface 2 as a fairly thin or shallow stream extending substantially across the screen, determined in its initial velocity by the hydraulic head of the slurry and progressively thickening by loss of liquid through the screen openings 5. In acting on a slurry flowing across or cross-wise of the screen wires 3 along the screen's flow surface or deck 2, the rounded leading edge 7 of each screen wire directs slurry passed thereto from the preceding screen wire across the intervening opening 5 upwardly onto the screen wire's top 6 which directs part of the slurry onto the succeeding screen wire, with the sharp trailing edge 8, by breaking or disrupting adhesion between the top and the slurry, preventing or inhibiting flow of slurry over the trailing edge downwardly onto the trailing side 8.

While the screen wires 3 are uniform in size and shape and their disposition relative to the tie rods 4, in the preferred screen 1, the flat tops 6 of the screen wires 3 are not coplanar and instead slope downwardly or are declined rearwardly or toward the rear so that each wire directs the slurry passing thereover against a confronting lateral surface of the succeeding wire below the upper extremity of the latter's leading edge 7. As a consequence, the preferred flow surface 2 is a slot-interrupted serrated or stepped surface in which the leading edges 7 project or extend above the tops 6 of the screen wires and in effect serve as transverse ribs for inducing in the flowing slurry an up-and-down, rippling or undulating motion, the effect of which is to stratify the slurry and concentrate the fibers and other relatively light solids in an upper layer or stratum. With the slurry so stratified, the angle or degree of the rearward decline of the top of each screen wire 3 may be such that its plane intersects the confronting surface of the succeeding or next screen wire not only below the upper extremity but, as illustrated, also somewhat below the lower extremity of its rounded leading edge 7 and thus along and within the vertical limits of the next wire's flat leading side 9. Coupled with the stratification of the slurry, each top 6, so angled, will direct or cause the predominantly liquid heavier lower stratum to impinge or impact upon the flat leading side 9 of the next screen wire for discharge of liquid downwardly therealong through the screen and the lighter upper layer in which the floating or suspended solids are concentrated to impinge or impact upon the upwardly curving part of the leading edge 7 for lifting or directing thereby upwardly onto the wire's flat top 6. By predetermining for a particular slurry flowing at a given velocity and screen openings 5 of a given width, the rearward declination of the top 6 of each wire 3 and the radius of curvature and thus downward extent of the wire's rounded leading edge 7, the screen 1 thus is able at each wire to separate part of the carrier liquid from the slurry by discharging it through the screen downwardly along the leading sides 9 of the screen wires and, by directing the remaining slurry upwardly over the wires' leading edges 7, to carry or transport fibrous and other relatively light or suspended solids along the flow surface under force of the flowing slurry and thereby prevent the solids from accumulating in and plugging or blinding the screen openings 5.

The width of the openings 5 in the flow surface 2 will depend on the particle size of the solids to be separated from the flowing slurry in the intended installation and will range downwardly from a maximum of about ¼ in. (0.635 cm.), and is predetermined by the minimum spacing between adjoining screen wires 3 as measured from the trailing edge 8 of one and, depending on the decline of the tops 6, to the leading edge 7 or side 9 together forming the front or frontal area 11 of the next or succeeding screen wire. With the sides 8 and 9 of each screen wire downwardly tapering or converging and confronting sides of adjoining wires correspondingly diverging below the openings 5, any part of the slurry entering any of the openings is free to pass therefrom downwardly through the screen. So long as this divergent relation obtains between the confronting sides of adjoining screen wires and the angular relation between the top 6 and trailing side 10 of each wire produces the sharp trailing edge 8, the particular angular disposition of the trailing sides 10 of the screen wires relative to the flow surface 2 or tie rods 4 does not affect the action of the screen in separating the liquid and solid contents of the slurry. On the contrary, since it is along the leading sides 9 of the screen wires 3 that separated liquid flows downwardly through the screen, the angular disposition of those sides relative to the flow surface 2 or the tie rods 4 will affect the rate of discharge of the liquid by determining whether the discharge is accelerated or, as sometimes desirable, retarded by the sides. Thus, if, as usually desired, the leading sides 9 are declined or downwardly sloped rearwardly from the flow surface 2 or toward the tie rods 4, the discharge will be accelerated by an assist to gravity from a component of the force of flow of the slurry. Conversely, the discharge will be retarded by back pressure imposed to the force of flow, if the sides 9 are either perpendicular or declined forwardly relative to the flow surface 2.

In terms of the mean or average of the flow surface 2, represented by dot-and-dash line 12 passing through the trailing edges 8 of the screen wires 3 and thus actually parallel to rather than coinciding with the actual mean surface, the primary angle, designated as "A", between the top 6 of a screen wire and the mean flow surface, may range from 0° to around 20° and preferably is an acute angle between those limits. The secondary angle, designated as "B", between the mean flow surface 12 and the leading side 9 of a screen wire, while also preferably an acute angle with an lower limit of about 75° for accelerating discharge of liquid through the screen, will be a right or obtuse angle, if it is desired to retard the discharge. In the illustrated embodiment, both the rearward declination of the tops 6 and downward and rearward inclination of the leading sides 9 are obtained by rearward tilting of screen wires generally isoceles triangular in shape, with the advantage that identical screen wires can be employed to make screens of different characteristics to meet different conditions by changing the tilt or angle at which they are fixed to the tie rods 4. However, if the tilt is to be varied and, as in the illustrated screen wires 3, the angular disposition of the top 6 of each wire relative to its leading side 9 is fixed, the relative angle usually should be such as to enable to top to be tilted within the preferred 0°–20° range of the angle A without increasing the preferably acute angle B between the leading side and mean flow surface 12 to or beyond 90°.

Aside from the slopes of the tops 6 and leading sides 9, the possible variables in the screen itself are the size and shape of and spacing between the screen wires 3, the size and shape of the tie rods 4 and mode of connection of the screen wires thereto and the radius of the preferably cylindrically convex leading edges 7. For a screen for a particular installation, the choise among these variables will depend on the solids and liquid content of the slurry, the velocity at which it is to flow along the flow surface 2 across the transversely disposed screen wires 3, and whether in the particular installation the screen is to be static or vibrating and have a concave or generally flat horizontal or inclined flow surface. Under any of these conditions, the flat tops 6, with their rounded leading edges 7 and sharp trailing edges 8, in causing the part of the slurry from a preceding wire impacting an upwardly curving surface of the leading edge to be lifted upwardly onto the flat top, directing that part along the flat top toward the next wire and at the sharp trailing edge breaking the adhesion between the top and the slurry and preventing downflow along the wire's trailing side 10, will mitigate against blinding or clogging of the screen openings by fibrous and other solids contained in the slurry. When, in addition, as in the preferred screen, the top 6 of each screen wire is rearwardly declined so as to direct slurry against the confronting front surface 11 of a succeeding wire, not only will the flow surface by its stepped or serrated formation induce stratification of the slurry and concentrate the fibrous and other relatively light solids in the slurry's upper layer, but when, as preferred, the degree of the slope is such as to direct the upper layer of the slurry onto the upwardly curving portion of the leading edge 7 and the primarily liquid lower layer against the leading side 9 of the succeeding wire, the solids and liquid are effectively separated without blinding of the screen. The separation is further enhanced if, as preferred, the leading side 9 of the wire declines rearwardly to discharge the liquid along that side with an assist to gravity of a component of the force of the flowing slurry.

From the above detailed description it will be apparent that there has been provided an improved screen for separating fibrous and other solids from a flowing slurry in which transversely spaced screen wires forming the screen's flow surface are so arranged and constructed as without blinding to separate the solids from the carrier liquid. It should be understood that the described and disclosed embodiment is merely exemplary of the invention and that all modifications are intended to be included that do not depart from the spirit of the invention and the scope of the appended claims.

Having now described my invention, I claim:

1. A slurry screen for separating fibrous and other solids from a slurry flowing longitudinally of the screen on and rearwardly along a flow surface thereof, comprising parallel spaced screen wires disposed transversely of said screen and interconnected by underlying spaced tie rods disposed longitudinally of said screen, said screen wires together forming said flow surface, each wire having downwardly converging leading and trailing sides and a rearwardly declined flat top bounded rearwardly by a sharp trailing edge for directing slurry flowing thereacross to a front of a succeeding wire, and a cylindrically convex leading edge on each wire extending between and merging tangentially with said leading side and top thereof for receiving and directing upwardly onto said top part of the slurry passed to said wire from a preceding wire.

2. A screen according to claim 1 wherein the plane of the rearwardly declined flat top of each screen wire intersects a confronting front of the succeeding screen wire below an upper extremity of the leading edge thereof.

3. A screen according to claim 1, wherein the leading side of each screen wire below the leading edge thereof is flat and downwardly and rearwardly sloping.

4. A screen according to claim 3, wherein the screen wires are rearwardly tilted relative to the tie rods.

5. A screen according to claim 3, wherein the flow surface of the screen is a slot-interrupted serrated flow surface inducing stratification of the slurry with fibrous and other relatively light solids concentrated in an upper layer thereof, and the tops of the screen wires are each so declined as to direct said upper layer of slurry passing thereover against an upcurving portion of the leading edge of the succeeding wire.

6. A screen according to claim 5, wherein the top of each screen wire directs a primarily liquid lower layer of the flowing slurry against the leading side of the succeeding screen wire below the leading edge thereof.

* * * * *

UNITED STATES PATENT AND TRADEMARK OFFICE
CERTIFICATE OF CORRECTION

PATENT NO. : 4,193,503
DATED      : March 18, 1980
INVENTOR(S) : James D. Connolly It is certified that error appears in the above—identified patent and that said Letters Patent is hereby corrected as shown below:

Column 3, line 44, "8" should read -- 10 --.

Column 4, line 33, "8 and 9" should read -- 9 and 10 --.

Signed and Sealed this

Fifteenth Day of July 1980

[SEAL]

Attest:

SIDNEY A. DIAMOND

Attesting Officer

Commissioner of Patents and Trademarks